Dec. 14, 1948. W. BURNS 2,456,172
SEED POTATO CUTTER
Filed March 4, 1946
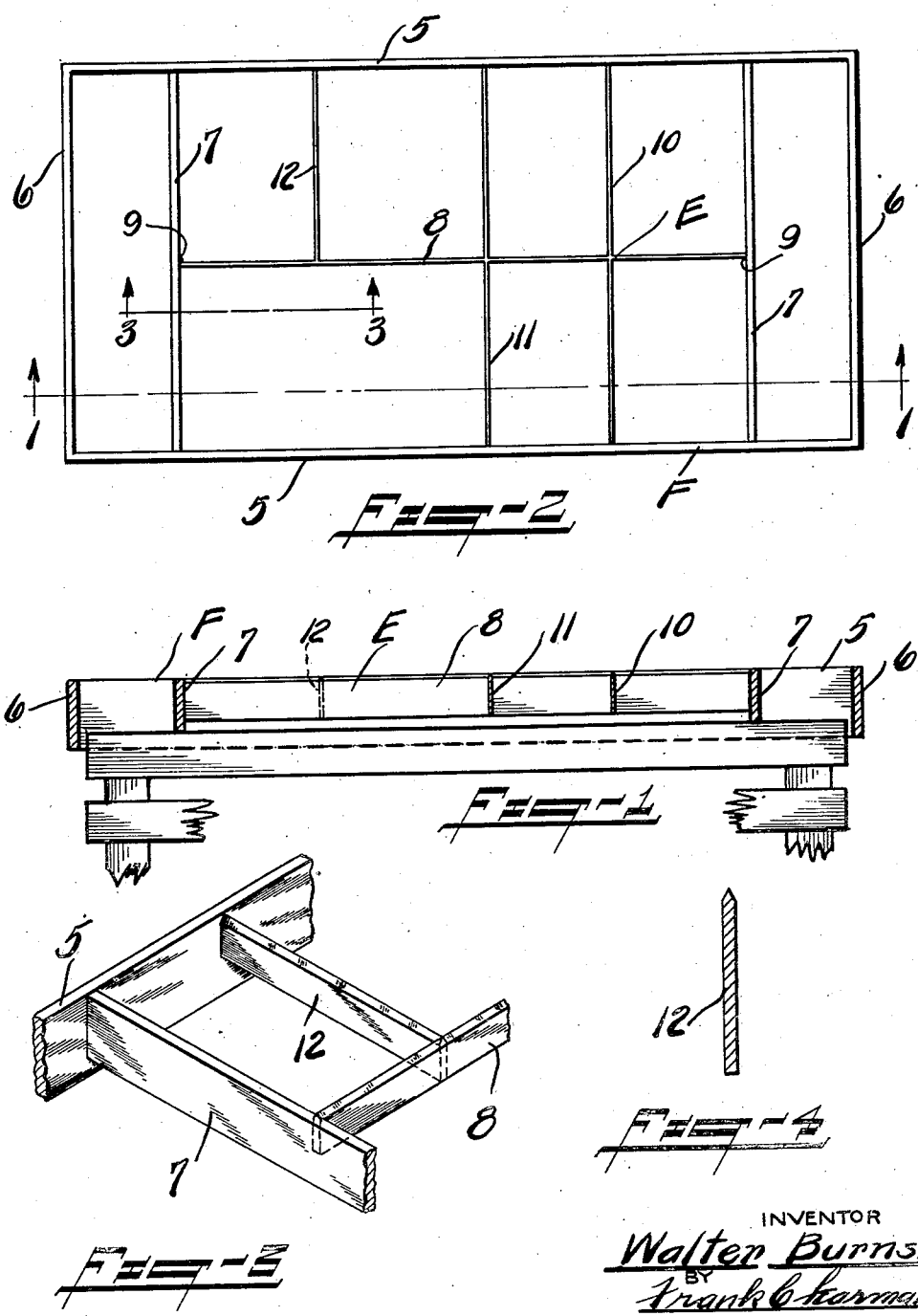
INVENTOR
Walter Burns.
BY
Frank C Karman
ATTORNEY Patented Dec. 14, 1948

2,456,172

UNITED STATES PATENT OFFICE 2,456,172

SEED POTATO CUTTER

Walter Burns, Munger, Mich.

Application March 4, 1946, Serial No. 651,685

1 Claim. (Cl. 146—170)

This invention relates to new and useful improvements in seed potato cutters and has for its principal object to design a simple, practical, and efficient means for cutting potatoes into pieces or segments of predetermined size and shape depending on the size and shape of the potatoes being cut.

Another object is to provide a convenient and compact cutting unit which is strong and durable, which can be positioned on a crate or other support, and into which the cut segments fall as the work progresses.

To the accomplishment of the foregoing and related ends, said invention then consists of the means hereinafter fully described and particularly pointed out in the claim; the attached drawing and following description setting forth in detail, certain means and one mode of carrying out the invention, such disclosed means and mode illustrating, however, but one of various ways in which the principle of the invention may be used.

In the drawing:

Fig. 1 is a sectional, side-elevational view showing the cutter mounted on a conventional potato crate.

Fig. 2 is a top plan view of the cutter.

Fig. 3 is an enlarged, fragmentary perspective view of the cutter taken on the line 3—3 of Fig. 2.

Fig. 4 is an enlarged, sectional view of one of the cutting elements.

Referring now more particularly to the drawing in which I have shown the preferred embodiment of my invention, the frame of the device is indicated at F, this is preferably rectangular in shape, and comprises side and end members 5 and 6 respectively, these frame members are preferably formed of bar iron welded at the corners, and transversely disposed cross members 7 span said frame at a point spaced a predetermined distance from the end members, thus forming a hand hold for handling the cutter and transferring it from crate to crate, and also serving to reinforce the frame to prevent bowing of the side members caused by the welding of the cutting elements in position.

Cutting elements E span the main frame and are disposed in predetermined patterns to accommodate potatoes of various sizes to the best advantage.

A longitudinally disposed cutting element 8 is welded to the cross bars 7 at the points 9, and transversely disposed cutting elements 10 and 11 are welded to the side frames 6 and to the members 8 to form a predetermined pattern for cutting potatoes which can be cut into either four or six segments.

A similar cutting element 12 spans the space between the side bar 6 and the member 8, and is welded thereto, this arrangement forming a different spacing or pattern to accommodate certain size and shape potatoes.

The cutting elements are of less depth than the bars, the upper edges being sharp and are kept in this condition by filing or in any other desired manner.

When the cutter is in use, the workman usually wears canvas, rubberized, or heavy gloves to protect his hands against contact with the sharp edges of the cutting element, the potato being placed, in proper position, on the knives and downward pressure cuts it into segments which drop into the crate C.

This cutting eliminates many movements at present necessary in hand cutting, as a complete potato is cut each time, whereas, each segment is individually cut in hand cutting, and consequently, the rate of cutting can be more than tripled with far less fatigue to the workman.

The pattern of the cutting elements is of prime importance in order that the cut segments or portions may be of substantially uniform size, for example, large potatoes will usually cut into six segments, medium size potatoes into four, and small potatoes into two parts.

Large potatoes are placed on the cutting members 8, 10, and 11, and as indicated in broken lines in Fig. 2 of the drawing, while medium size potatoes are also placed on blades 8, 10, and 11, smaller potatoes are cut into three pieces on blades 8 and 12, also indicated in broken lines in Fig. 2, while the smallest potatoes are cut on blade 12.

The frame is placed over a conventional crate C with the end bars 5 preventing displacement, the depth of the cutting elements being less than the main frame so that the crates can be evenly filled without removal of the device.

From the foregoing, it will be obvious that I have perfected a very simple, economical and substantial potato cutting machine for cutting seed potatoes of all sizes.

What I claim is:

A potato cutter comprising a rectangular frame, additional bars spanning the frame at a point spaced inwardly from the end bars thereof, said additional bars being of less depth than the main frame so that said frame fits over a standard potato crate, a plurality of cutting elements mounted in said frame and arranged in a predetermined pattern between the additional end bars and the side bars, a longitudinally disposed cutting element forming a part of said pattern, transversely disposed cutting elements bridging the side bars of said frame and connected thereto, and to the longitudinal element respectively, to cut the product into six or four segments, and an additional cutting element bridging the space between one side wall of the frame and the longitudinal cutting element for cutting the product into three segments.

WALTER BURNS.

REFERENCES CITED

The following references are of record in the file of this patent:

UNITED STATES PATENTS

| Number | Name | Date |
|---|---|---|
| 1,063,212 | Powell | June 3, 1913 |
| 1,445,555 | Ridpath | Feb. 13, 1923 |
| 1,991,554 | Haynes | Feb. 19, 1935 |
| 2,338,996 | Burns | Jan. 11, 1944 |